W. E. PAINE.
TRACTION VEHICLE.
APPLICATION FILED APR. 30, 1913.
1,093,289.
Patented Apr. 14, 1914.
3 SHEETS—SHEET 1.
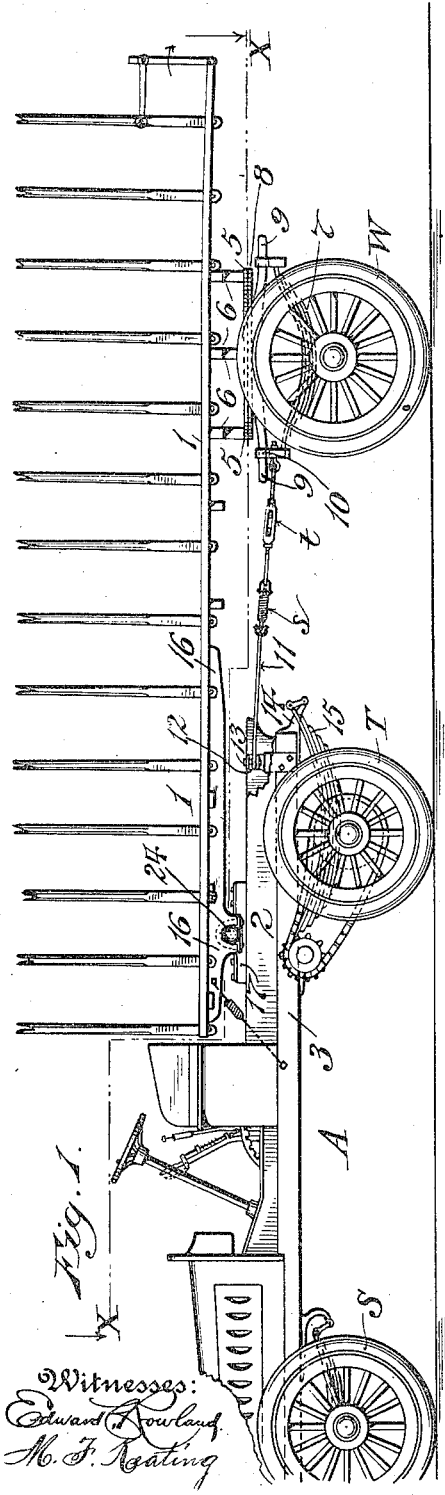
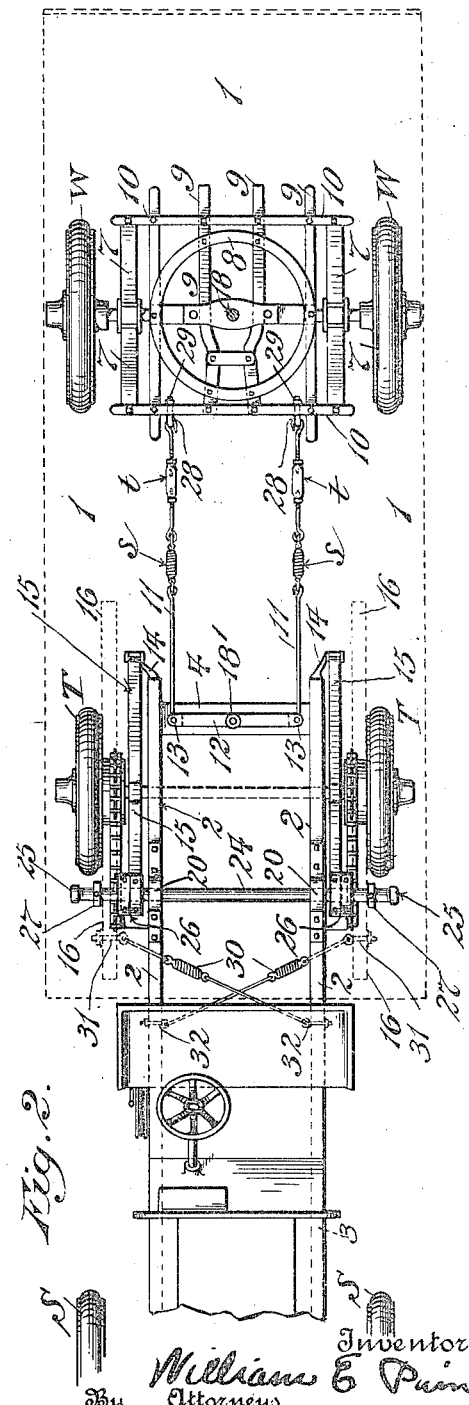

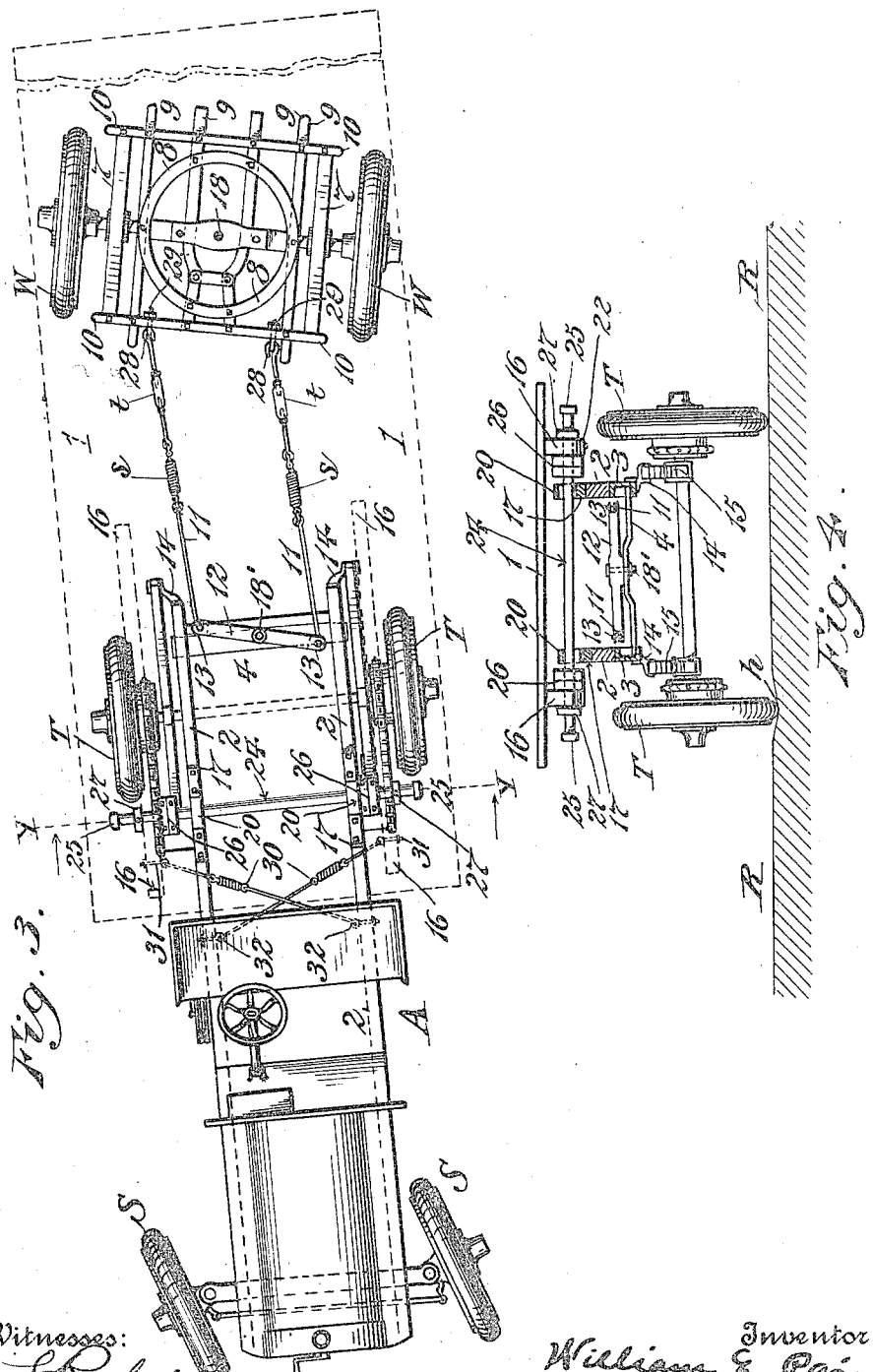

W. E. PAINE.
TRACTION VEHICLE.
APPLICATION FILED APR. 30, 1913.
1,093,289.
Patented Apr. 14, 1914.
3 SHEETS—SHEET 3.
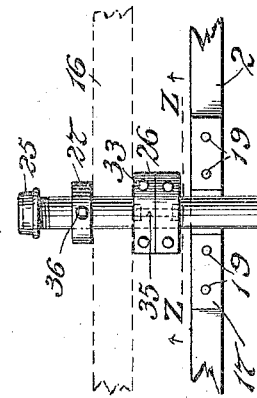
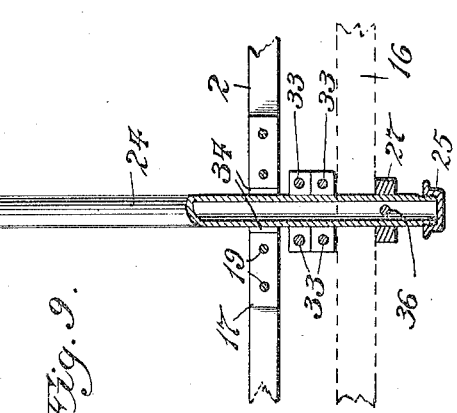
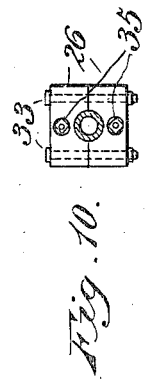
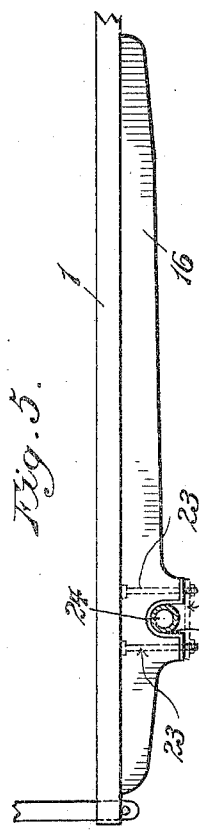
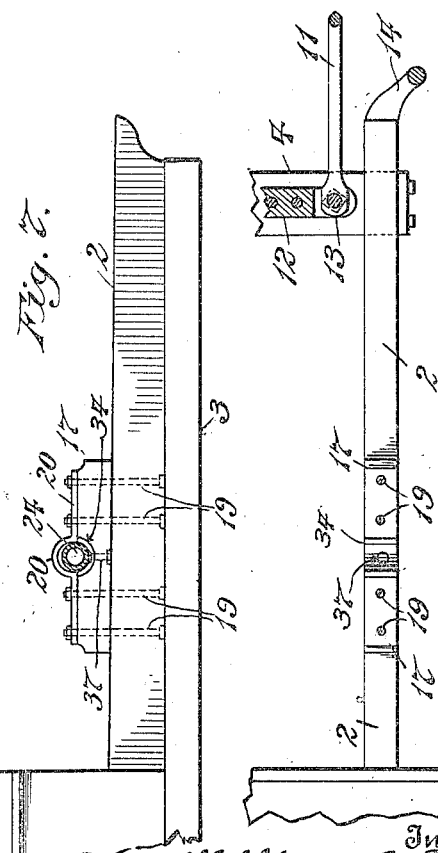

UNITED STATES PATENT OFFICE.

WILLIAM E. PAINE, OF NEW YORK, N. Y.

TRACTION-VEHICLE.

1,093,289.  Specification of Letters Patent.  Patented Apr. 14, 1914.

Application filed April 30, 1913. Serial No. 764,636.

*To all whom it may concern:*

Be it known that I, WILLIAM E. PAINE, a citizen of the United States, and resident of New York, borough of Manhattan, county and State of New York, have made a new and useful Invention in Traction-Vehicles, of which the following is a specification.

My invention is directed particularly to that class of motor vehicles known as of the trailer type, in which the major portion of the load is carried upon a trailer in the rear of the vehicle, and to this end it consists in improvements upon prior inventions disclosed in U. S. patents heretofore granted to me, namely, No. 1025714 of May 7th, 1912 and No. 1037168 of August 27th, 1912, and especially in improvements upon the latter, in which latter patent I have disclosed in Figure 4 of the drawings a load carrying bed or platform rigidly supported by traction wheels and a trailer, and elsewhere in the drawings a load carrying platform which is vertically flexible only.

I have discovered that in the use of such a vehicle considerable of the propelling power is absorbed in turning in either direction with the load because of the strains which necessarily follow from a lack of lateral or side flexibility, such strains resulting in effecting a sidewise sliding movement of the traction wheels upon the road surface thereby not only acting destructively upon the tires thereof but causing, with heavy loads, very much power to be uselessly absorbed.

In my before-mentioned Patent No. 1025714, which is designed to carry such lengthy loads as can be carried without a bed or platform to support them; namely, long timbers, girders, or beams, such as are used on vessels and for building purposes, I overcome this waste of energy by causing the front end of the load to shift as the steering wheels vary from right to left or vice versa and maintain the application of power in a line drawn through the center of gravity in the axial center of the load. With vehicles, however, designed to carry merchandise this lateral shifting is not effected in the invention disclosed in my before-mentioned Patent No. 1037068 to the desired extent.

The present invention, therefore, has for its objects, first, to devise a vehicle of this character which shall minimize the applied power used by causing the front end of the bed or platform which carries the load, and hence the front end of the load also, to shift from right to left or vice versa in accordance with the direction of motion given the vehicle by the chauffeur, thus maintaining the center of gravity thereof in the line of the axial length of the load; therefore, wasting little or no energy by reason of useless strains. Second, to devise a vehicle of this character in which the strains put upon it by reason of rough or uneven roads shall not cause useless energy to be absorbed from the applied power. Third, to provide a vehicle of this character in which the operative parts which sustain and carry the load may be as flexible as possible and may adapt itself to uneven roads without absorbing energy of the applied power in its operation, the bed or platform of the same being constructed practically rigid and not subject to any variation of conformation which will be transmitted to the load and the load resting practically without distortions. Fourth, to provide means whereby all of the wheels of a six wheeled vehicle may be caused to remain upon the road surface at all times regardless of the unevenness thereof. I accomplish these results by providing a motor vehicle with a plurality of wheels, both steering and traction, and a trailer flexibly so connected and related thereto and to the bed or platform by laterally and vertically moving means and a turn table that any unevenness of road surface or variation in direction of movement will not affect the load in course of transportation in such manner as to uselessly absorb power.

For a full and clear understanding of the invention, such as will enable others skilled in the art to construct and use the same, reference is had to the accompanying drawings, in which, Fig. 1 is a side elevational view of my invention complete. Fig. 2 is a part sectional, part plan view thereof taken on the broken line X—X, Fig. 1, and as seen looking thereat from the top toward the bottom of the drawings in the direction of the arrows, the load carrying bed or platform and the two front longitudinal strengthening stringers therefor being shown in dotted lines. Fig. 3 is a similar view to Fig. 2 showing the operation of the invention when the chauffeur is turning the vehicle from right to left, illustrating how the bed or platform and the load carried thereby is caused to shift as the vehicle advances. Fig.

4 is a part cross sectional, part elevational view taken on the line Y—Y Fig. 3 and as seen looking from left to right in the direction of the arrows, illustrating the operation of the vehicle when one of the traction wheels encounters a relatively great unevenness of road surface. Figs. 5 to 9 inclusive are enlarged detail views of the parts of my invention carried by the motor vehicle for effecting the results sought. Fig. 10 is a sectional view taken through Fig. 9 on the line Z—Z as seen looking in the direction of the arrows from the bottom toward the top of the drawings.

Referring now to the drawings in detail, A represents the main or propelling part of the complete vehicle of any preferred type having traction wheels T and steering wheels S; W, W being the trailer wheels.

1 represents the bed or platform which is preferably made of strong material properly braced, counter-braced and provided with cross-bars under its lower side for the purpose of making it efficient for carrying heavy loads.

3 represents longitudinal chassis side bars, and 4 the cross bars for connecting said side bars together, there being only one of such cross bars visible at the rear of the machine.

5 is the stationary part of a turn table rigidly secured beneath the bed or platform 1 by standards connected to a plurality of iron cross bars 6, as shown.

8 (see Figs. 2 and 3) is the movable part of the turn table supported by and bolted to a series of longitudinal bars 9, these bars 9 being bolted and thereby secured to a pair of horizontal bolsters 10 the opposite ends of which are connected to springs 7 which in turn are carried by the axle of the trailer wheels W, W.

18 is a bolster pin for laterally pivotally connecting the stationary and movable parts of the turn table.

11, 11 are equalizing cords, chains or rods pivotally connected at their free ends through the equalizer 12 to the rear one of the cross bars 4 by a king bolt 18¹ and connected by hooks 28 at their rear ends and by eye bolts 29 to the front bolster 10 of the trailer.

s, s, are springs and t, t, turn buckles, said springs and turn buckles being utilized for the purpose of yieldingly adjusting the tension of the equalizing cords.

The parts so far described are in general terms the same as the like parts disclosed in my before-mentioned Patent No. 1037168, except that the parts of what I term the equalizer are in this instance modified slightly for the purpose of obtaining better results; namely, they are made yielding and adjustable in the manner disclosed by the springs s and turn buckles t and the rear ends thereof are connected directly to the front bolster of the trailer in such manner as to exert a draft upon the same when called upon in a more direct and economical manner, the equalizer 12 itself being pivoted behind the traction wheels T so that as the traction wheels or steering wheels rise and fall in passing over uneven roadway the pull will be more directly upon the equalizer, thus economizing in the expenditure of force.

Referring now to that portion of the invention which effects the adjustment of the bed or platform and the load carried thereby with relation to the application of power upon the vehicle, (see particularly Figs. 5 to 10 inclusive) 16, 16 represent parallel longitudinal stiffening stringers located at the front end beneath and on each side of the bed or platform, the same being securely bolted thereto. These stringers are each provided on their under side at the front with an oblong journal bearing 21 which is provided at its lower end with a strong iron plate 22 held in place by bolts 23 which pass through the stringers 16, their function and the function of the journal bearings being to slidingly hold the hollow hinged pivot rod 24, which rod is provided at each end with lateral or horizontal sliding washers made up preferably of four blocks 26, 26, bolted together in the manner shown in Figs. 9 and 10, by bolts 33 and 35; 27, 27 being adjustable spacing blocks held by set-screws 36 upon the opposite ends of the hollow hinged rod 24 for effecting the desired amount of lateral swing it is found necessary to give to the front end of the bed or platform 1 and hence the load carried thereby. 25, 25 are detachable screw-caps for the hollow rod 24 for preventing the spacing blocks 27 from being lost in the event of the set-screws 36 becoming loosened. 2, 2 are additional longitudinal stringers permanently secured to the upper surfaces of the side bars 3 of the chassis, each of said stringers being provided with a journal bearing block 17 which is secured by bolts 19 passing through the stringers 2 and bolted in extended ends of the journal bearings 20 (see Fig. 7). 34, 34 are lower journal bearings located within the face of the blocks 17 and held in place by bolts 37, 37, these journal bearings being oblong or elliptical to a sufficient extent to admit of vertical play of the hollow rod 24. 30, 30 are spring rods diagonally connected to the front ends of the stringers 16 by bolts 31 and to the side bars 3 of the chassis by additional bolts 32, their function being to normally maintain these stringers and hence the bed or platform 1 together with its load in direct alinement with the axis of the load carried thereby and the axis of the entire vehicle when the same is running straight forward so that the wheels thereof all track.

Referring now to Fig. 4 of the drawings, 14, 14 represent downward extensions from the ends of the side bars 3 of the chassis which are connected in the usual manner by links with the springs 15 of the traction wheels of the vehicle (see also Fig. 2). R, Fig. 4, represents the surface of the roadway and $h$ a depression therein calculated to vary the relations between the wheeled part of the vehicle and the bed or platform so as to cause the same to be put under abnormal twisting or torsional strains which absorb useless power, as will be explained in connection with the description of the mode of operation, which is as follows: In loading the vehicle as described in connection with my before-mentioned patents it is important that the same should be so distributed that the center of gravity shall be relatively close to the point of applied power and that the major portion thereof shall be upon the trailer wheels W; also that the hollow, sliding, hinged rod 24 shall, in the present invention, be journaled upon the chassis of the vehicle A at a point in front of the axis of the traction wheels T at such distance therefrom as will give the best traction effects, and also proper steering effects upon the steering wheels S with the best application of power from the sprocket wheels which drive the traction wheels T, as shown in Fig. 1 of the drawings. Therefore, it will be apparent that as long as the vehicle moves in a direct line and as the power is applied in the manner described relatively no power is absorbed by unusual strains between the load and the propelling and carrying parts of the vehicle, by reason of its flexible nature, as will now be described.

When the chauffeur turns the vehicle to the left, as indicated in Fig. 3, the action of the various parts described is as therein shown; that is to say, immediately when the steering wheels S assume the position shown the trailer wheels W assume a diagonally diverse position and tend to carry the rear end of the bed or platform in such direction that its longitudinal axis and hence the longitudinal axis of the load carried thereby will remain in a right line drawn through the center of gravity of the load and the axial center of the vehicle, thus making the application of the power in a direct line. This action causes the front end of the bed or platform and the load to be shifted laterally in the same manner that the load was shifted in the invention disclosed in my earlier Patent No. 1025714, and this adjustment between the load and the movement of direction of the rear or trailer wheels is effected, as will be understood, according to the direction of movement of the steering wheels and the length of such movement. This lateral movement is effected by shifting the bed or platform from right to left or vice versa, and hence the front part of the load is carried by the hollow hinged rod 24 slidingly journaled in the pairs of oblong journal bearings 20, 20 supported by the journal blocks 17 and longitudinal stringers 2, 2 on the side bars 3 of the chassis, and also by the additional oblong journal bearings 21, 21 supported by the longitudinal stringers 16.

Any difference in level of the road in a longitudinal direction between the steering wheels S and trailer wheels W will be compensated for by reason of the hinged effect of the hollow rod 24 and the four journal bearings, so that all strains due to this effect are compensated for; and any diagonal or twisting strains which would be put upon the bed or platform, as indicated in Fig. 4 of the drawings where one of the traction wheels has fallen into the depression or rut $h$, will be overcome by reason of the longitudinal relation of the two sets of journal bearings 20 and 21 and the corresponding journals on the rod 24, it being understood that the axle of the traction wheels is inclined downward to the left so that the hollow rod 24 remains substantially level in the bottom of the oblong journal bearing 20 on the right and in the top of the oblong journal bearing 20 on the left and hence the bed or platform remains substantially level so that no strains are transmitted thereto and hence to the load. The equalizer 12, it will be understood, will also take care of inequalities in the road surface which might affect the action of the trailer wheels W in the same manner as disclosed in my before-mentioned Patent No. 1037168, with the additional advantage, in the present invention, that the rearrangement of the parts make a more perfect application of power and hence avoids waste of energy and by the adjustability of these parts and the yielding action of the springs $s$ compensates for these disturbances. The two diagonally disposed rods 30 are adjustably put under yielding strains so that when the vehicle assumes a direct longitudinal movement and the wheels track they will, by reason of their action, yieldingly bring the stringers 16 and hence the bed or platform and its load to its normal position, by reason of their lateral adjusting effect, so that the parts will, acting thus automatically together, avoid any undue shocks and strains and the vehicle will carry the load without abnormal waste of energy and thus readjust itself in accordance with all of the conditions of road surface and direction of movement given to it by the chauffeur.

My invention has an especial utility in connection with tram cars and railway cars generally where the curvature of the tracks is relatively small and the difference in the level of the rails correspondingly great, as will be understood, it being appreciated that with my invention I compensate for all of the strains put upon the trucks and carrying beds or platforms in the manner specified, and I wish it understood that my claims comprehend its use with all kinds of wheeled vehicles designed to carry relatively heavy loads.

I do not limit myself to the details of structure hereinbefore disclosed and illustrated in the accompanying drawings, for effecting the movements of relatively heavy loads upon wheeled vehicles under the various conditions of road surface enumerated, as I believe it is broadly new with me to provide a vehicle of the type named with a plurality of wheels, three or more, adapted to carry the power transmitting mechanism, and a trailer operatively connected thereto adapted to carry the major portion of the load and to so arrange the same that the loss of energy due to varying or uneven conditions of road surface will be effectually compensated for by hingingly and slidingly connecting the front part of the load carrying bed or platform to the traction wheels of the vehicle in such manner that the load is caused to be drawn by the traction wheels with a minimum expenditure of energy and that the several wheels of the vehicle may fully retain their contact with the surface of the road at all times and still not unnecessarily strain the bed or platform of the vehicle in such manner as to unnecessarily absorb the power employed in driving it. My invention, therefore, comprehends generically means for effecting the several adjustments hereinbefore described of the moving parts of the vehicle with relation to the stationary or fixed parts of the load carrying part thereof. In other words, I believe it is broadly new with me to compensate for the loss effects of energy due to changes in direction of such a vehicle as this by horizontally slidingly attaching the free end of the bed or platform to the vehicle for effecting lateral adjustments due to changes of direction, and at the same time pivotally attach the load carrying bed or platform to the vehicle for compensating for the loss of energy due to differences in road level between the several wheels; and for compensating for strains between the wheels and the load carrying bed or platform by diagonally adjusting the relation of said parts so that the loss of energy due to twisting or torsional strains is avoided.

What I claim and desire to secure by Letters Patent of the United States is—

1. A motor vehicle having a plurality of wheels, a bed or platform and a trailer, the front end of said bed or platform being slidingly and pivotally attached to the rear end of the vehicle and the rear end thereof pivotally attached to the trailer, substantially as described.

2. A motor vehicle having a plurality of wheels and a bed or platform slidingly and pivotally attached thereto at its front end; in combination with a turn table the fixed part of which is attached beneath the bed or platform with the movable part carried directly by the wheels of the trailer, substantially as described.

3. A motor vehicle in combination with a trailer and a bed or platform therefor, said bed or platform being slidingly and pivotally attached to the vehicle in front of the axle of the traction wheels thereof, the trailer being horizontally pivotally fixed beneath the rear end of the bed or platform, substantially as described.

4. A motor vehicle having a trailer and a rigid bed or platform pivotally connected thereto and slidingly and pivotally connected to the rear end of the vehicle in such a manner as to have lateral motion in relation thereto, substantially as described.

5. A motor vehicle having a bed or platform and a trailer adapted to carry the rear end thereof; together with means for slidingly and pivotally connecting the front end of the same to the rear end of the vehicle and yielding means for maintaining the bed or platform in alinement with the body of the vehicle when the latter and the trailer are running in alinement, substantially as described.

6. A motor vehicle having steering wheels, traction wheels and a trailer; together with a bed or platform the rear end of which is pivotally carried by the trailer and the front end carried by the rear end of the vehicle; means for slidingly and pivotally connecting the front end of the bed or platform to the body of the vehicle, and means yieldingly connecting the two for bringing them into alinement as the vehicle and the trailer assume a lineal direction of movement, substantially as described.

7. A trailer for a motor vehicle embracing a bed or platform pivotally attached to a pair of trailer wheels and provided with means for rigidly maintaining the parallelism between the axle of the trailer wheels and the bed or platform, its front end being provided with means for vertically pivotally connecting it to a motor vehicle, whereby the wheels of the trailer will freely partake of vertical movement corresponding to inequalities in the roadway, substantially as described.

8. A trailer for a motor vehicle embracing a bed or platform attached to a pair of trailer wheels at its rear end and provided at its front end with means for slidingly and pivotally connecting it to a motor vehicle in such a manner as to have lateral motion in relation thereto, substantially as described.

9. A trailer for a motor vehicle embracing a bed or platform pivotally attached to a pair of trailer wheels at its rear end, its front end being provided with means for slidingly and pivotally connecting it to a motor vehicle; and additional means for permitting of torsional movements of the body or frame of the motor vehicle without producing twisting or torsional strains upon the bed or platform, substantially as described.

10. A trailer for a motor vehicle embracing a bed or platform and a turn table supporting the rear end of the same, the movable part of said turn table being secured to the wheels of the trailer; detachable means for movably securing the turn table to the vehicle at its rear, and means located at the front of the bed or platform for laterally slidingly and pivotally attaching it to the vehicle at another point, substantially as described.

11. A trailer for a motor vehicle embracing load carrying wheels and a bed or platform properly braced throughout its length and provided with longitudinal stringers beneath its sides so as to give it relatively great strength, and pivotally secured to the wheels so as to admit of lateral pivotal movement only; said stringers being provided with oblong journal bearings on their under sides for adapting the bed or platform to be slidingly and pivotally attached to a motor vehicle, substantially as described.

12. Means for connecting a trailer and its bed or platform to the chassis of a motor vehicle embracing two pairs of oblong journal bearings carried respectively by the sides of the chassis of the vehicle and beneath the bottom of the bed or platform of the trailer, and a rod slidingly and pivotally secured between said pairs of journal bearings; together with lateral slidable means adapted to be carried by the rod for limiting the lateral movement of the interconnected parts, substantially as described.

13. A motor vehicle in combination with a trailer having a bed or platform with its rear end carried by a turn table and its front end slidingly and pivotally connected to the vehicle; together with means for yieldingly maintaining parallelism between the body of the vehicle and the axial length of the bed or platform; and an equalizing device between the wheels of the trailer and the rear part of the vehicle, substantially as described.

14. A wheeled vehicle embracing steering and traction wheels and a chassis or frame carried thereby; a trailer therefor having a rigid bed or platform connected pivotally and slidingly at its front end to said chassis or frame, in front of the axle of the traction wheels, and rigidly supported at its rear end by the fixed portion of the trailer, the wheels of which have pivotal connection therewith; together with an equalizer connected to the trailer and the rear end of the chassis or frame, substantially as described.

In testimony whereof I have signed my name to this specification in the presence of two subscribing witnesses.

WILLIAM E. PAINE.

Witnesses:
C. J. KINTNER,
WM. A. PARKE.